United States Patent
Gu et al.

(10) Patent No.: US 10,693,998 B1
(45) Date of Patent: Jun. 23, 2020

(54) SYSTEMS AND METHODS FOR CREATING APPLICATION RATINGS

(71) Applicant: Symantec Corporation, Mountain View, CA (US)

(72) Inventors: Lei Gu, Bedford, MA (US); Keith Newstadt, West Newton, MA (US)

(73) Assignee: NortonLifeLock Inc., Tempe, AZ (US)

( * ) Notice: Subject to any disclaimer, the term of this patent is extended or adjusted under 35 U.S.C. 154(b) by 635 days.

(21) Appl. No.: 15/237,323

(22) Filed: Aug. 15, 2016

(51) Int. Cl.
*H04L 29/12* (2006.01)
*H04L 29/08* (2006.01)

(52) U.S. Cl.
CPC .............. *H04L 67/36* (2013.01); *H04L 67/22* (2013.01); *H04L 67/34* (2013.01)

(58) Field of Classification Search
CPC ................................. H04L 12/26; H04L 29/12
USPC ......................................................... 709/224
See application file for complete search history.

(56) References Cited

U.S. PATENT DOCUMENTS

| | | | |
|---|---|---|---|
| 9,208,179 B1 | 12/2015 | Song et al. | |
| 9,210,090 B1 | 12/2015 | Baldi et al. | |
| 2011/0246306 A1* | 10/2011 | Blackhurst | G06Q 30/02 705/14.58 |
| 2012/0173358 A1* | 7/2012 | Soroca | G06Q 30/02 705/26.3 |
| 2013/0007255 A1* | 1/2013 | Gerber | G06F 11/302 709/224 |
| 2015/0186952 A1* | 7/2015 | Brown | G06Q 30/0273 705/14.52 |

OTHER PUBLICATIONS

Identifying Your App in iTunes Connect; https://developer.apple.com/library/content/documentation/LanguagesUtilities/Conceptual/iTunesConnect_Guide/Chapters/FirstSteps.html; as accessed Jan. 5, 2017; Feb. 8, 1999.
Apple Store; https://itunes.apple.com/us/app/apple-store/id375380948?mt=8; as accessed Jan. 5, 2017; Jun. 16, 2010.
Angry Birds; https://itunes.apple.com/us/app/angry-birds/id343200656?mt=8; as accessed Jan. 5, 2017; Jan. 30, 2010.
In-app purchase; http://www.webopedia.com/TERM/I/in-app_purchase.html; as accessed Jan. 5, 2017; May 17, 2012.

* cited by examiner

*Primary Examiner* — Vivek Srivastava
*Assistant Examiner* — Sibte H Bukhari
(74) *Attorney, Agent, or Firm* — FisherBroyles, LLP (57) ABSTRACT

The disclosed computer-implemented method for creating application ratings may include (i) determining that a user device has downloaded an application, (ii) monitoring the usage of the application on the user device, (iii) deducing a value of the application based at least in part on the monitored usage, and (iv) creating a rating for the application that indicates the deduced value of the application. Various other methods, systems, and computer-readable media are also disclosed.

20 Claims, 6 Drawing Sheets

SYSTEMS AND METHODS FOR CREATING APPLICATION RATINGS

BACKGROUND

Users of software applications (e.g., smart phone applications) often rely on ratings to inform their application purchases. Traditionally, these ratings may be based on how previous users of the application rated the product. However, such ratings may fail to quickly give potential purchasers an accurate feel for the true value of an application. In some instances, the rating may only provide a limited amount of information (e.g., an average number of stars given by previous users). In other instances, the information may also include detailed user comments. While these comments may include detailed information, the information may be poorly organized and difficult to assimilate. Furthermore, the traditional ratings may only provide potential purchasers with information describing previous purchasers' initial reactions to a product. The disclosed systems and methods, therefore, identify a need for improved systems and methods for creating ratings for software applications.

SUMMARY

As will be described in greater detail below, the instant disclosure describes various systems and methods for creating application ratings. In one example, a computer-implemented method for creating application ratings may include (i) determining that a user device has downloaded an application, (ii) monitoring the usage of the application on the user device, (iii) deducing a value of the application based at least in part on the monitored usage, and (iv) creating a rating for the application that indicates the deduced value of the application.

In some examples, monitoring the usage of the application may include monitoring an amount of time for which the application is used on the user device and/or a frequency with which the application is used on the user device. Additionally or alternatively, monitoring the usage of the application may include monitoring a number of times a user is prompted to make an in-App purchase and/or a frequency at which the user is prompted to make in-App purchases. In one embodiment, the method may also include monitoring whether the user accepts and/or declines to make an in-App purchase upon being prompted to make the in-App purchase. In additional or alternative embodiments, monitoring the usage of the application may include monitoring a cost of one or more in-App purchases made via the user device.

In some examples, monitoring the usage of the application may include monitoring traffic between the user device and a website associated with the application and deducing the usage of the application based on the monitored traffic. In other examples, monitoring the usage of the application may include collecting information received by a server that provides application purchasing services for the application. In one embodiment, monitoring the usage of the application may also include monitoring an age level at which the application is being used and/or a change in the age level.

In some examples, deducing the value of the application may include (i) identifying an average amount of time for which a group of user devices use the application, the user devices including the user device, (ii) determining whether the average amount of time surpasses a use-threshold, and (iii) deducing the value based at least in part on the threshold determination. Additionally or alternatively, deducing the value of the application may include (i) identifying an average total cost of the application spent by a group of user devices, the user devices including the user device and the average total cost including both an initial cost of the application and a cost of one or more in-App purchases, (ii) determining whether the average total cost surpasses a cost-threshold, and (iii) deducing the value based at least in part on the cost determination.

In one embodiment, a system for implementing the above-described method may include (i) a determination module, stored in memory, that determines that a user device has downloaded an application, (ii) a monitoring module, stored in memory, that monitors the usage of the application on the user device, (iii) a deducing module, stored in memory, that deduces a value of the application based at least in part on the monitored usage, (iv) a creation module, stored in memory, that creates a rating for the application that indicates the deduced value of the application, and (v) at least one physical processor configured to execute the determination module, the monitoring module, the deducing module, and the creation module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) determine that a user device has downloaded an application, (ii) monitor the usage of the application on the user device, (iii) deduce a value of the application based at least in part on the monitored usage, and (iv) create a rating for the application that indicates the deduced value of the application.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for creating application ratings. As will be explained in greater detail below, the disclosed systems and methods provide a new application rating system that is based on (i) usage patterns of users who use an application, (ii) in-App purchase solicitations, and/or (iii) how users respond to in-App purchase solicitations (e.g., by completing the solicited purchase, ignoring the solicitation, discontinuing use of the application, etc.). In some examples, the ratings may indicate that an application has high value if the average amount of time for which users use the application is high relative to an average total cost (i.e., including both the initial cost and the cost of in-App purchases) of the application. Contrarily, the ratings may indicate that an application has a low value if the average amount of time for which users use the application is low relative to the average total cost of the application.

In some examples, usage and purchase-solicitation information may be gleaned from home routers of users who use the application. Additionally or alternatively, such information may be collected from a server and/or program servicing the application and/or from the application itself. By basing ratings on community data (e.g., community usage data and/or community purchase request data), the disclosed systems and methods may provide a heftier rating system that may quickly inform users of the true value of an application (e.g., how much the application is used, how quickly users lose interest in the application, how often users are inundated with in-App purchase requests, how likely the true cost of using the application will be higher than the initial purchase price, etc.). Thus, the disclosed systems and methods may improve application-purchase platforms and application-purchase applications by improving ratings of applications available for purchase.

Figure 1:
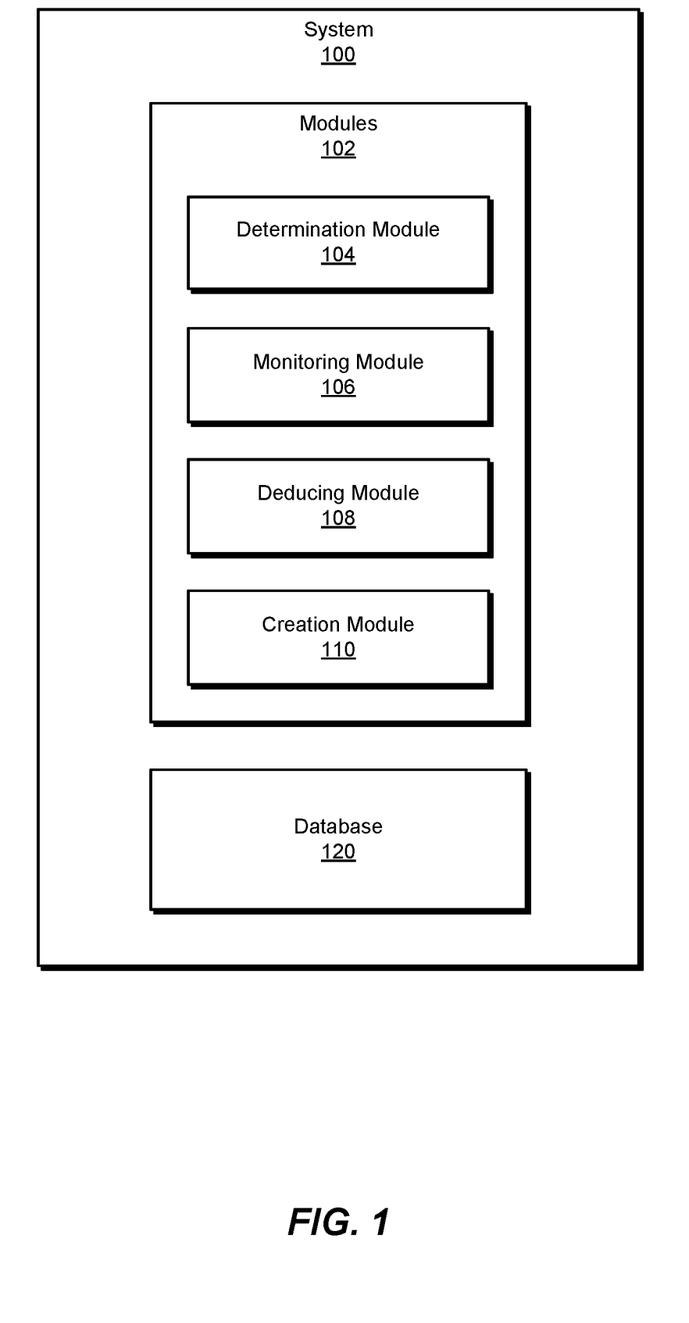
FIG. 1 is a block diagram of an exemplary system for creating application ratings.
Figure 2:
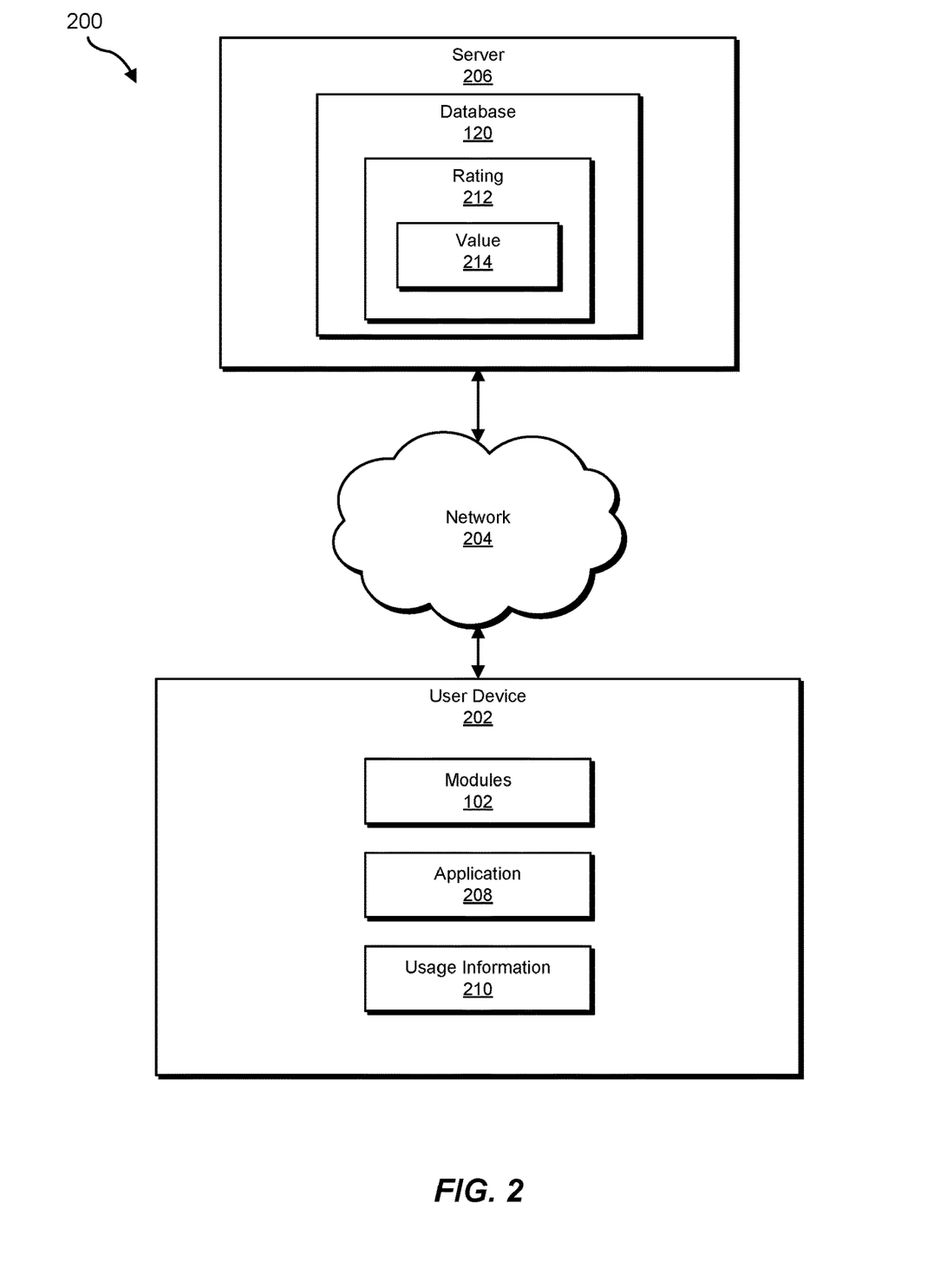
FIG. 2 is a block diagram of an additional exemplary system for creating application ratings.
Figure 3:
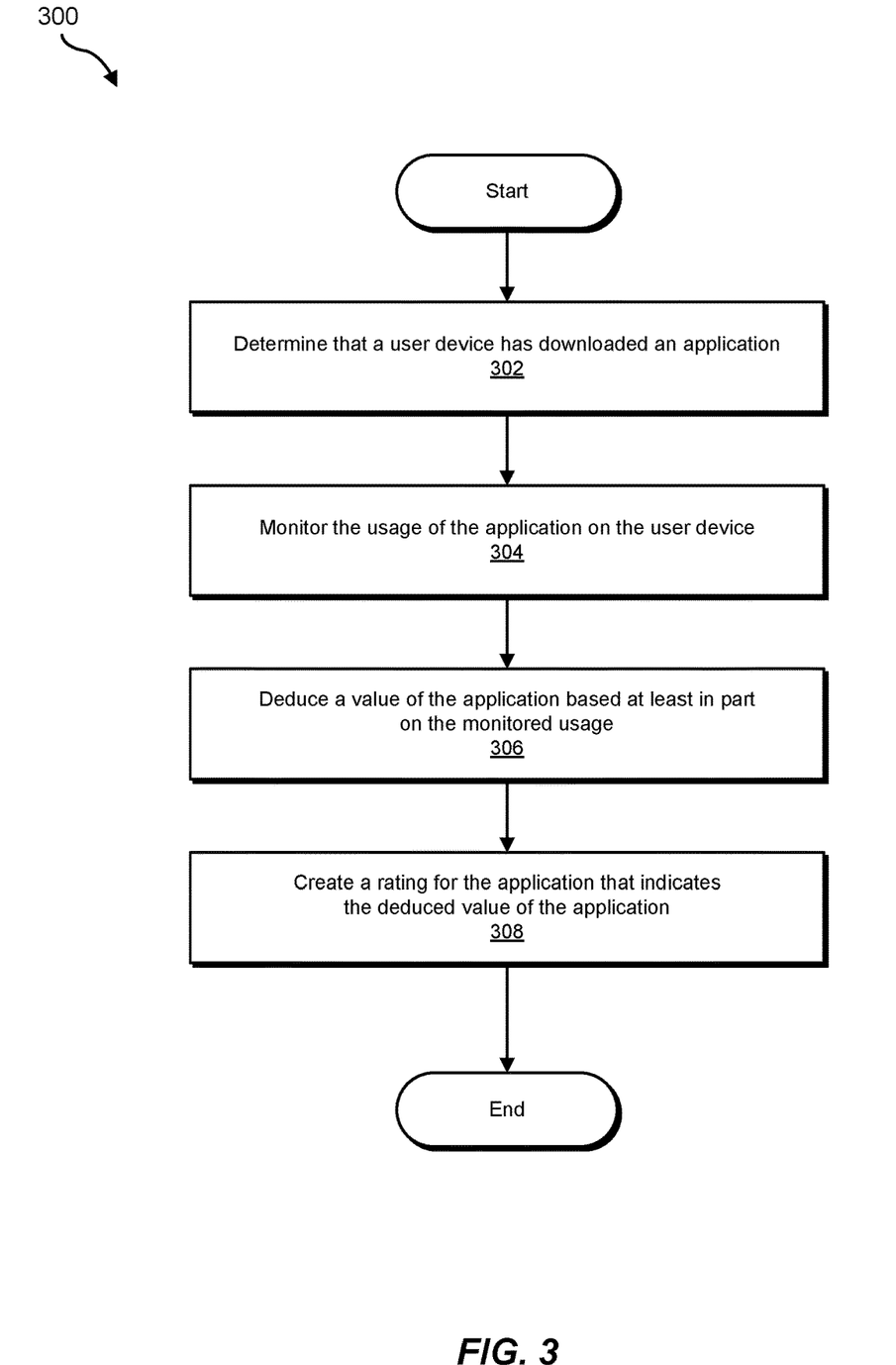
FIG. 3 is a flow diagram of an exemplary method for creating application ratings.
Figure 4:
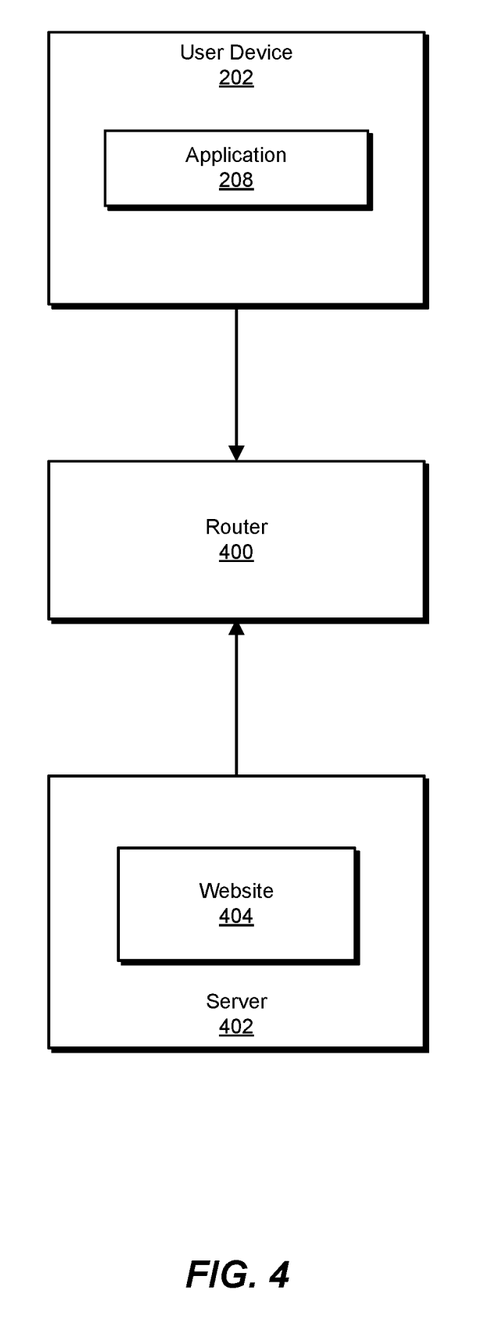
FIG. 4 is a block diagram of an exemplary computing system for monitoring computer usage using a router.

The following will provide, with reference to FIGS. 1-2 and FIG. 4, detailed descriptions of exemplary systems for creating application ratings. Detailed descriptions of corresponding computer-implemented methods will also be provided in connection with FIG. 3. In addition, detailed descriptions of an exemplary computing system and network architecture capable of implementing one or more of the embodiments described herein will be provided in connection with FIGS. 5 and 6, respectively.

FIG. 1 is a block diagram of exemplary system 100 for creating application ratings. As illustrated in this figure, exemplary system 100 may include one or more modules 102 for performing one or more tasks. For example, and as will be explained in greater detail below, exemplary system 100 may include a determination module 104 that determines that a user device has downloaded an application. Exemplary system 100 may additionally include a monitoring module 106 that monitors the usage of the application on the user device. Exemplary system 100 may also include a deducing module 108 that deduces a value of the application based at least in part on the monitored usage. Exemplary system 100 may additionally include a creation module 110 that creates a rating for the application that indicates the deduced value of the application. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., user device 202 and/or server 206), the devices illustrated in FIG. 4 (e.g., router 400), computing system 510 in FIG. 5, and/or portions of exemplary network architecture 600 in FIG. 6. One or more of modules 102 in FIG. 1 may also represent all or portions of one or more special-purpose computers configured to perform one or more tasks.

As illustrated in FIG. 1, exemplary system 100 may also include one or more databases, such as database 120. In one example, database 120 may be configured to store ratings, such as rating 212. Additionally or alternatively, database 120 may be configured to store one or more rating policies. Database 120 may represent portions of a single database or computing device or a plurality of databases or computing devices. For example, database 120 may represent a portion of server 206 in FIG. 2, computing system 510 in FIG. 5, and/or portions of exemplary network architecture 600 in FIG. 6. Alternatively, database 120 in FIG. 1 may represent one or more physically separate devices capable of being accessed by a computing device, such as server 206 in FIG. 2, computing system 510 in FIG. 5, and/or portions of exemplary network architecture 600 in FIG. 6.

Exemplary system 100 in FIG. 1 may be implemented in a variety of ways. For example, all or a portion of exemplary system 100 may represent portions of exemplary system 200 in FIG. 2. As shown in FIG. 2, system 200 may include a user device 202 in communication with a server 206 via a network 204. In one example, user device 202 may be programmed with one or more of modules 102 and/or may store all or a portion of the data in database 120. Additionally or alternatively, server 206 may be programmed with one or more of modules 102 and/or may store all or a portion of the data in database 120.

In one embodiment, one or more of modules 102 from FIG. 1 may, when executed by at least one processor of user device 202 and/or server 206, enable user device 202 and/or server 206 to create application ratings. For example, and as will be described in greater detail below, determination module 104 may determine that user device 202 has downloaded an application 208. Monitoring module 106 may collect usage information 210 by monitoring the usage of application 208 on user device 202. Deducing module 108 may deduce a value 214 of application 208 based at least in part on the monitored usage. Creation module 110 may create a rating 212 for application 208 that indicates the deduced value 214 of application 208.

User device 202 generally represents any type or form of computing device capable of reading computer-executable instructions. Examples of user device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, exemplary computing system 510 in FIG. 5, or any other suitable computing device. In some examples, user device 202 may download application 208 (e.g., from an application-purchase platform).

Server 206 generally represents any type or form of computing device that is capable of creating ratings. Examples of server 206 include, without limitation, application servers and database servers configured to provide various database services and/or run certain software applications. In some examples, server 206 may represent an application-purchase platform, such as APPLE STORE, from which user device 202 may download applications such as application 208.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 600 in FIG. 6, or the like. Network 204 may facilitate communication or data transfer using wireless or wired connections. In one embodiment, network 204 may facilitate communication between user device 202 and server 206.

Application 208 generally represents any type or form of computer program that causes a computing system to perform useful tasks. In examples in which user device 202 represents a mobile device, application 208 may represent a mobile application.

FIG. 3 is a flow diagram of an exemplary computer-implemented method 300 for creating application ratings. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 510 in FIG. 5, and/or portions of exemplary network architecture 600 in FIG. 6.

As illustrated in FIG. 3, at step 302, one or more of the systems described herein may determine that a user device has downloaded an application. For example, determination module 104 may, as part of user device 202 and/or server 206 in FIG. 2, determine that user device 202 has downloaded application 208.

Determination module 104 may determine that user device 202 has downloaded application 208 in a variety of ways. In some examples, determination module 104 may receive information indicating that user device 202 has downloaded application 208 from the application-purchase platform from which application 208 was purchased. In one such embodiment, determination module 104 may operate as part of the application-purchase platform and obtain such information directly. Alternatively, determination module 104 may receive a notification from the application-purchase platform indicating that user device 202 has purchased and/or downloaded application 208 from the application-purchase platform (e.g., in response to querying an API of the application-purchase platform for such information).

In other examples, determination module 104 may receive information indicating that user device 202 has downloaded application 208 from user device 202. For example, determination module 104 may receive such information from an application-purchase application installed on user device 202. In some examples, determination module 104 may operate as part of a home router (and/or receive information from a home router), such as router 400 illustrated in FIG. 4. In this example, determination module 104 may deduce that user device 202 has downloaded application 208 based on traffic between user device 202 and a website 404 serviced by a server 402 that services application 208 (e.g., using protocol decomposition as will be discussed in greater detail below in connection with step 304).

Returning to FIG. 3, at step 304, one or more of the systems described herein may monitor the usage of the application on the user device. For example, monitoring module 106 may, as part of user device 202 and/or server 206 in FIG. 2, gather usage information 210 detailing the usage of application 208 on user device 202.

Monitoring module 106 may monitor a variety of types of usage information. In some examples, monitoring module 106 may monitor how often a user is using application 208. For example, monitoring module 106 may determine an amount of time for which application 208 is used on user device 202. In one such example, monitoring module 106 may determine a total number of hours and/or minutes that a user uses application 208 on user device 202. Additionally or alternatively, monitoring module 106 may determine a frequency with which a user accesses application 208 on user device 202 (e.g., daily, weekly, biweekly, etc.).

In one example, monitoring module 106 may monitor how time-usage changes over time. To give a specific example, monitoring module 106 may identify that a user of user device 202 uses application 208 for two hours a day for the first week application 208 is downloaded onto user device 202, then thirty minutes every other day on the second week, and then less than once a week thereafter.

In some examples, monitoring module 106 may monitor the use of in-App purchases in connection with application 208. As used herein, the term "in-App purchase" generally refers to any type or form of purchase that a user is prompted to make in order to advance his or her usage of application 208. In some examples, an in-App purchase-request may be presented to a user via an application pop-up while the user is using application 208. In some such examples, the in-App purchase may be completed directly from within application 208. In one embodiment, the user may be prevented from using application 208 and/or a subset of the functionalities of application 208 unless he or she agrees to the in-App purchase. For example, the user may be prompted to make an in-App purchase in order to access special content or features (e.g., power-ups, restricted levels, virtual money, special characters, boosts, etc.). In some examples, an in-App purchase may be required to initiate some kind of usage upgrade.

In some examples, monitoring module 106 may monitor how often a user is prompted to make in-App purchases while using application 208 on user device 202. For example, monitoring module 106 may determine a total number of times the user is prompted to make an in-App purchase while using application 208. Additionally or alternatively, monitoring module 106 may determine a frequency at which the user is prompted to make an in-App purchase while using application 208. In one example, monitoring module 106 may identify how much time passes before the user is first prompted to make an in-App purchase after he or she downloads application 208. Additionally or alternatively, monitoring module 106 may monitor whether the user accepts or declines to make an in-App purchase when prompted to do so.

In some examples, monitoring module 106 may also monitor how in-App purchase requests change over time. For example, monitoring module 106 may determine whether the time that passes between each in-App purchase request changes over time. To give a specific example, monitoring module 106 may determine that for the first week of usage, the user is prompted to make an in-App purchase once a week, but that starting with the second week of usage, the user is prompted to make an in-App purchase at least twice a day. In one example, monitoring module 106 may determine whether in-App purchase requests correspond to a change in usage. To give a specific example, monitoring module 106 may determine that each time a user changes the age level at which he or she is using application 208, he or she is prompted to make an in-App purchase.

In some examples, monitoring module 106 may also identify a cost of one or more of the in-App purchases. In some embodiments, monitoring module 106 may use in-App purchase information to calculate a total amount spent by a user of user device 202 on application 208. This total amount may include, for example, an initial cost of application 208 and a cost of each subsequent in-App purchase made by the user and may reflect the true cost of ownership of application 208. Additionally or alternatively, monitoring module 106 may calculate a total cost of application 208 that includes the cost of each in-App purchase request (whether or not the user accepts the request).

In one embodiment, monitoring module 106 may calculate a ratio that indicates how much application 208 costs a user of user device 202 relative to some time measurement. In one example, monitoring module 106 may calculate this ratio by dividing (i) the total time a user spends using application 208 or the total number of times he or she accesses application 208 by (ii) the total amount spent by the user on application 208. To give a specific example, monitoring module 106 may determine that the use spent ten cents on application 208 for each hour of use and/or each time he or she accessed application 208.

In some examples, monitoring module 106 may gather information relating to a demographic of a user using application 208. For example, monitoring module 106 may identify an age level at which application 208 is being used and/or a charge in the age level at which application 208 is being used. In this embodiment, the disclosed systems and methods may create separate ratings for application 208 based on the demographic.

Monitoring module 106 may intercept usage information 210 in a variety of ways. In some examples, monitoring module 106 may receive usage information 210 from an application-purchase application installed on user device 202 (which the user of user device 202 used to purchase application 208) and/or from a server hosting the application-purchase platform from which application 208 was purchased. Additionally or alternatively, monitoring module 106 may receive usage information 210 from application 208 (e.g., via an API) and/or from a server (such as server 402 in FIG. 4) hosting a website (such as website 404 in FIG. 4) that manages application 208.

In one example, monitoring module 106 may monitor traffic between user device 202 and a website associated with application 208 (e.g., a website that provides content which a user interacts with while using application 208). In this example, monitoring module 106 may deduce usage information 210 based on the monitored traffic. In some examples, monitoring module 106 may obtain this information from a router (e.g., a smart home router) used by user device 202. Using FIG. 4 as a specific example, monitoring module 106 may obtain traffic information between application 208 and website 404 from router 400.

Monitoring module 106 may monitor the traffic in a variety of ways. In some embodiments, the traffic may be encrypted such that monitoring module 106 may not directly observe the content of the traffic. In these embodiments, monitoring module 106 may deduce the encrypted traffic's content based on the patterns of the encrypted traffic (e.g., identified by analyzing payloads). In some examples, monitoring module 106 may rely on models (which may, in some examples, be stored in database 120) of patterns of encrypted traffic that indicate what type of content is likely to correspond to a particular traffic pattern. In one embodiment, the disclosed systems and methods may have previously created the models of patterns of traffic using machine learning.

The patterns of traffic may rely on a variety of types of information. In some examples, the traffic information may include an amount of data that user device 202 sends to website 404 and/or an amount of data that website 404 sends to user device 202. To give a specific example, monitoring module 106 may deduce, based on (i) an amount of data sent from website 404 to user device 202 and/or (ii) an amount of data sent, in response, from user device 202 to website 404, that website 404 is sending user device 202 a purchase request.

In some examples, monitoring module 106 may monitor multiple user devices that have downloaded an instance of application 208. In examples in which monitoring module 106 operates as part of an application-purchase platform, monitoring module 106 may monitor all of the user devices that have downloaded an instance of application 208 (and/or a representative subset of all such user devices). In other examples, monitoring module 106 may monitor all of the user devices that utilize a service (e.g., a security service, a smart home service, etc.) that services user device 202 (and/or a representative subset of all such user devices).

Returning to FIG. 3, at step 306, one or more of the systems described herein may deduce a value of the application based at least in part on the monitored usage. For example, deducing module 108 may, as part of user device 202 in FIG. 2, deduce value 214 of application 208 based at least in part on usage information 210.

As used herein, the term "value" generally refers to the worth and/or utility of an application. In some examples, an application's value may be measured by how often the application is used relative to how much the application cost. Deducing module 108 may deduce value 214 in a variety of ways. In some examples, deducing module 108 may deduce value 214 based on one or more factors. Deducing module 108 may weigh these factors according to weights as dictated by a value policy. In some embodiments, these factors may represent the various aspects of usage information 210 collected by monitoring module 106, such as the examples of usage information 210 explained in connection with step 304.

In examples in which monitoring module 106 monitors multiple user devices, deducing module 108 may deduce value 214 based on aggregated information. In some embodiments, the aggregated information may include an average amount of time for which the user devices use application 208. For example, aggregated time information may indicate an average total time for which application 208 is used and/or an average frequency at which application 208 is used. In some embodiments, the aggregated information may include aggregated in-App purchase information, such as how often users are prompted to make purchases, how often users accept purchase requests, and/or how often users decline and/or uninstall application 208 after being prompted to make an in-App purchase. In some embodiments, the aggregated information may include aggregated cost information, such as an average amount spent on application 208 and/or an average amount users are requested to spend on application 208.

In some examples, deducing module 108 may deduce value 214 based on one or more thresholds (e.g., as dictated in a value policy). For example, deducing module 108 may be configured with a value policy that includes a use-threshold. In this example, deducing module 108 may determine the value of application 208 based on whether an amount of time for which a user of user device 202 uses application 208 (and/or an average amount of time for which a group of users use instances of application 208) surpasses the use-threshold. To give another example, deducing module 108 may be configured with a value policy that includes a cost-threshold. In this example, deducing module 108 may determine the value of application 208 based on whether a total cost of application 208 spent by the user of user device 202 (and/or an average total cost spent by a group of users of application 208) surpasses the cost-threshold. To give another example, deducing module 108 may be configured with a value policy that includes a purchase-request threshold. In this example, deducing module 108 may determine the value of application 208 based on whether a number of purchase requests made to the user of user device 202 (and/or an average number of purchase requests made to a group of users of application 208) surpasses the purchase-request threshold.

At step 308, one or more of the systems described herein may create a rating for the application that indicates the deduced value of the application. For example, creation module 110 may, as part of user device 202 in FIG. 2, create rating 212 for application 208 that indicates the deduced value 214 of application 208.

Creation module 110 may create a rating that takes a variety of forms. In some examples, rating 212 may be binary (e.g., "High Value" or "Low Value") and/or based on a rating-scale (e.g., "Good Value," "Moderate Value," "Low Value"). In some examples, rating 212 may take the form of a number of stars (e.g., receiving between one and five stars). In some examples, rating 212 may include a value description. For example, rating 212 may include the sentence "The average user uses application 208 five times a week and spends a total of $12.00 on in-App purchases." In one embodiment, rating 212 may include a ratio indicating how much application 208 costs relative to some time measurement. To give a specific example, rating 212 may include information that indicates that the average cost of application 208 is ten cents an hour.

In some examples, creation module 110 may create multiple ratings for multiple demographics. For example, in examples in which application 208 is intended to be used by children, creation module 110 may create multiple ratings for application 208 based on age level. To give a specific example, creation module 110 may create a first rating for application 208 for users aged 2-4, a second rating for users aged 5-6, and a third rating for users aged 7-8.

In some examples, creation module 110 may create rating 212 based on value 214 deduced by deducing module 108. To give a specific example, if deducing module 108 determines that (i) the amount of time for which a user uses application 208 surpasses a use-threshold and (ii) the user's total cost of application 208 falls below a cost-threshold, creation module 110 may give application 208 a "High Value" rating. Contrarily, if deducing module 108 determines that (i) the amount of time for which a user uses application 208 falls below a use-threshold and/or (ii) the total cost of application 208 surpasses a cost-threshold, creation module 110 may give application 208 a "Low Value" rating.

Similarly, creation module 110 may give application 208 a "Low Value" rating if the amount of time that passes before a user is first prompted to make an in-App purchase falls below a time-threshold and/or if the user stops using application 208 after being prompted to make an in-App purchase. Additionally or alternatively, creation module 110 may give application 208 a "Low Value" rating if the total number and/or frequency of in-App purchase requests surpasses a purchase-request threshold.

By basing rating 212 on actual usage data and purchase data (e.g., instead of relying solely on deliberate feedback from users), creation module 110 may create a rating that is more objective than a deliberate review and that does not require users to manually submit reviews. Furthermore, rating 212 may quickly inform potential purchasers of application 208 of how much to expect to spend on application 208 and how much usage to expect to gain.

As described above, the disclosed systems and methods provide an application rating system based on usage patterns and in-App purchase solicitation rates. The disclosed usage patterns may include, without limitation, (i) how long and/or how often an application is used for, (ii) how quickly a user responds to an in-App purchase request, and/or (iii) how the user responds to an in-App purchase request (e.g., by paying, ignoring, or stopping to use the application altogether). The disclosed purchase-request information may include, without limitation, (i) how many and/or how often a user is prompted to make in-App purchases, (ii) an amount of time before the first in-App purchase request is made, (iii) how frequently in-App purchase requests are made, and/or (iv) when in-App purchase requests occur (e.g., each time a child using the application changes age level).

In some examples, an application may receive a rating indicating a good value if the user gets a significant amount of use at the purchase price and/or at a price that is not significantly more than the purchase price. Contrarily, an application may receive a rating indicating a bad value if the user (i) does not get much use from the application, (ii) is prompted for additional purchases after a short amount of use time (implying that an application-store price did not reflect the true cost), and/or (iii) stops using the application after being asked to make an additional purchase.

In some examples, usage and purchase-request information may be collected by a home router. In these examples, the home router may rely on protocol decomposition to recognize payloads and deduce the usage and purchase-request information.

Figure 5:
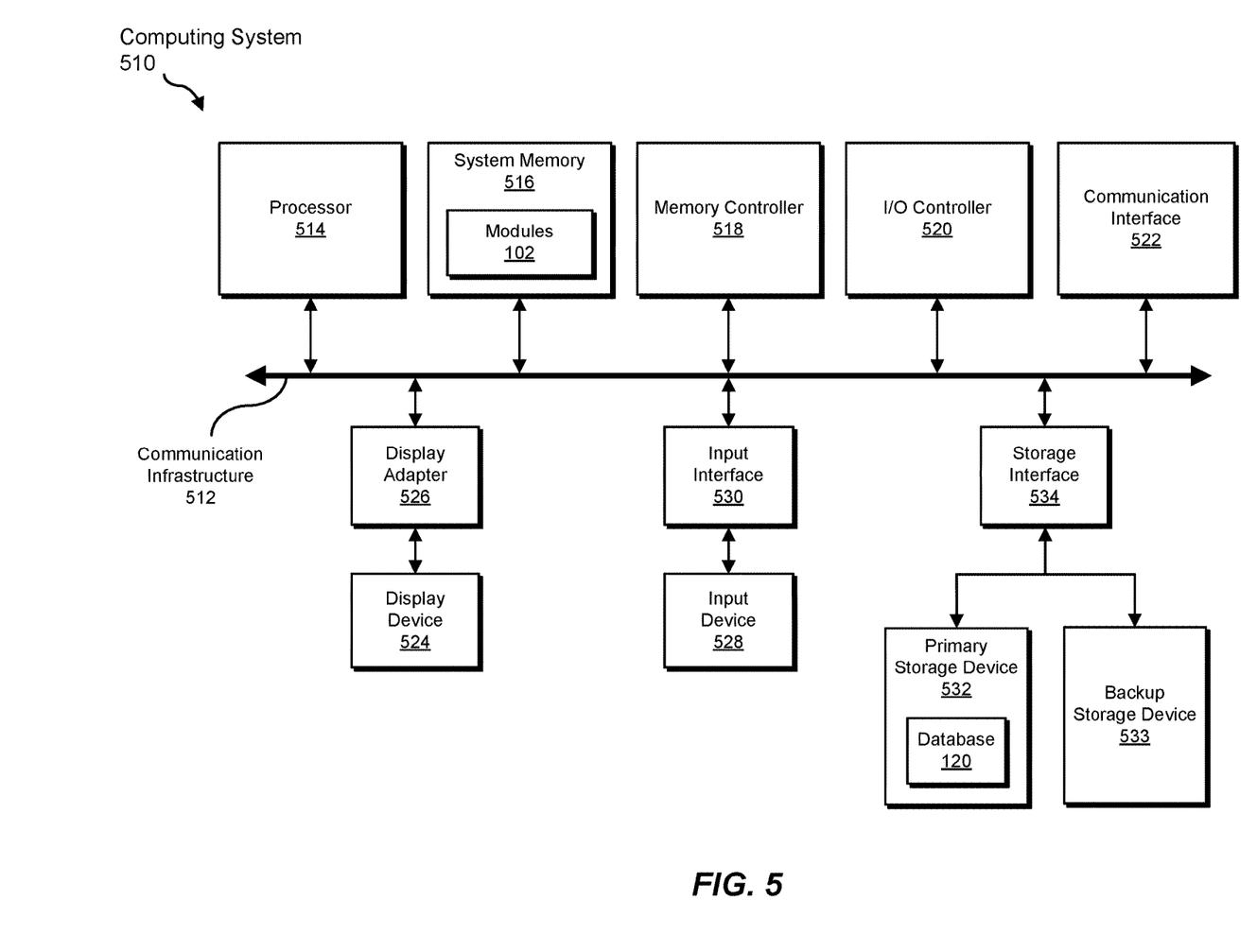
FIG. 5 is a block diagram of an exemplary computing system capable of implementing one or more of the embodiments described and/or illustrated herein.

FIG. 5 is a block diagram of an exemplary computing system 510 capable of implementing one or more of the embodiments described and/or illustrated herein. For example, all or a portion of computing system 510 may perform and/or be a means for performing, either alone or in combination with other elements, one or more of the steps described herein (such as one or more of the steps illustrated in FIG. 3). All or a portion of computing system 510 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of physical processing unit (e.g., a hardware-implemented central processing unit) capable of processing data or interpreting and executing instructions. In certain embodiments, processor 514 may receive instructions from a software application or module. These instructions may cause processor 514 to perform the functions of one or more of the exemplary embodiments described and/or illustrated herein.

System memory 516 generally represents any type or form of volatile or non-volatile storage device or medium capable of storing data and/or other computer-readable instructions. Examples of system memory 516 include, without limitation, Random Access Memory (RAM), Read Only Memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In certain embodiments, exemplary computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an Industry Standard Architecture (ISA), Peripheral Component Interconnect (PCI), PCI Express (PCIe), or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also include at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device.

As illustrated in FIG. 5, exemplary computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510. In one example, database 120 from FIG. 1 may be stored in primary storage device 532.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 510. All or a portion of the computer program stored on the computer-readable medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an Application Specific Integrated Circuit (ASIC) adapted to implement one or more of the exemplary embodiments disclosed herein.

Figure 6:
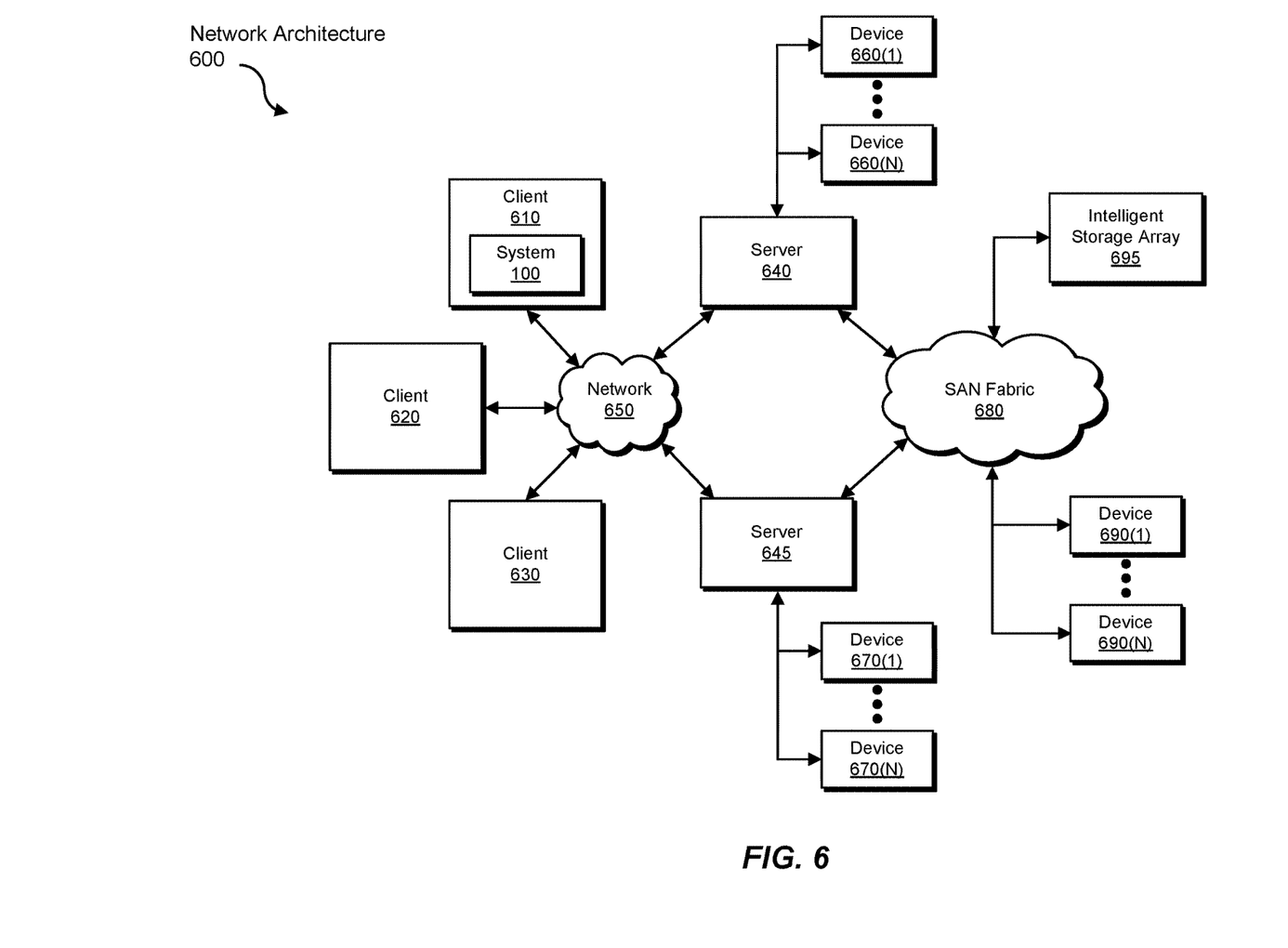
FIG. 6 is a block diagram of an exemplary computing network capable of implementing one or more of the embodiments described and/or illustrated herein.

FIG. 6 is a block diagram of an exemplary network architecture 600 in which client systems 610, 620, and 630 and servers 640 and 645 may be coupled to a network 650. As detailed above, all or a portion of network architecture 600 may perform and/or be a means for performing, either alone or in combination with other elements, one or more of the steps disclosed herein (such as one or more of the steps illustrated in FIG. 3). All or a portion of network architecture 600 may also be used to perform and/or be a means for performing other steps and features set forth in the instant disclosure.

Client systems 610, 620, and 630 generally represent any type or form of computing device or system, such as exemplary computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a WAN, a LAN, a PAN, or the Internet. In one example, client systems 610, 620, and/or 630 and/or servers 640 and/or 645 may include all or a portion of system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent Network-Attached Storage (NAS) devices configured to communicate with servers 640 and 645 using various protocols, such as Network File System (NFS), Server Message Block (SMB), or Common Internet File System (CIFS).

Servers 640 and 645 may also be connected to a Storage Area Network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650.

As detailed above, computing system 510 and/or one or more components of network architecture 600 may perform and/or be a means for performing, either alone or in combination with other elements, one or more steps of an exemplary method for creating application ratings.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive usage data and transform the usage data to value rating. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for creating application ratings, at least a portion of the method being performed by a computing device comprising at least one processor, the method comprising:
   determining that a user device has downloaded an application;
   monitoring the usage of the application on the user device, wherein monitoring the usage comprises:
      identifying a total amount of time for which the application is used on the user device; and
      identifying a total amount spent by the user on the application, the total amount comprising an initial cost of the application and a cost of any subsequent in-App purchases;
   deducing a value of the application based at least in part on the monitored usage, wherein the deducing comprises deducing the value based on:
      the total amount spent by the user on the application; and
      the total amount of time for which the application is used on the user device; and
   creating a rating for the application that indicates the deduced value of the application, wherein the rating comprises a ratio indicating a cost of the application relative to a time measurement.

2. The computer-implemented method of claim 1, wherein:
   monitoring the usage of the application further comprises monitoring at least one of:
      a frequency with which the application is used on the user device; and
      a change in time-usage on the user device over time; and
   deducing the value comprises deducing the value based further on at least one of the monitored frequency and the monitored change in time-usage.

3. The computer-implemented method of claim 1, wherein:
   monitoring the usage of the application further comprises monitoring at least one of:
      a number of times a user is prompted to make an in-App purchase; and
      a frequency at which the user is prompted to make an in-App purchase; and
   deducing the value comprises deducing the value based further on at least one of the monitored number of times and the monitored frequency at which the user is prompted to make the in-App purchase.

4. The computer-implemented method of claim 1, wherein deducing the value based on the total amount of time for which the application is used on the user device comprises:
   identifying an average total amount of time for which a plurality of user devices use the application, the plurality of user devices comprising the user device;
   determining whether the average amount of time surpasses a use-threshold; and
   deducing the value based at least in part on the threshold determination.

5. The computer-implemented method of claim 1, wherein:
   monitoring the usage of the application further comprises monitoring whether the user accepts and/or declines to make an in-App purchase upon being prompted to make the in-App purchase; and
   deducing the value comprises deducing the value based further on whether the user accepts and/or declines to make the in-App purchase.

6. The computer-implemented method of claim 1, wherein monitoring the usage of the application further comprises:
   monitoring traffic between the user device and a website associated with the application; and
   deducing the usage of the application based on the monitored traffic.

7. The computer-implemented method of claim 1, wherein monitoring the usage of the application comprises collecting information received by a server that provides application purchasing services for the application.

8. The computer-implemented method of claim 1, wherein monitoring the usage of the application further comprises monitoring at least one of:
   an age level at which the application is being used; and
   a change in the age level.

9. The computer-implemented method of claim 8, wherein creating the rating comprises creating a plurality of ratings, wherein each of the plurality of ratings is based on a different age level.

10. The computer-implemented method of claim 1, wherein deducing the value of the application based on the total amount spent by the user on application comprises:
    identifying an average total cost of the application spent by a plurality of user devices, the plurality of user devices comprising the user device and the average total cost including both an initial cost of the application and a cost of one or more in-App purchases;
    determining whether the average total cost surpasses a cost-threshold; and
    deducing the value based at least in part on the cost determination.

11. A system for creating application ratings, the system comprising:
    a determination module, stored in memory, that determines that a user device has downloaded an application;

a monitoring module, stored in memory, that monitors the usage of the application on the user device, wherein the monitoring comprises:
  identifying a total amount of time for which the application is used on the user device; and
  identifying a total amount spent by the user on the application, the total amount comprising an initial cost of the application and a cost of any subsequent in-App purchases;
a deducing module, stored in memory, that deduces a value of the application based at least in part on the monitored usage, wherein the deducing comprises deducing the value based on:
  the total amount spent by the user on the application; and
  the total amount of time for which the application is used on the user device;
a creation module, stored in memory, that creates a rating for the application that indicates the deduced value of the application, wherein the rating comprises a ratio indicating a cost of the application relative to a time measurement; and
at least one physical processor configured to execute the determination module, the monitoring module, the deducing module, and the creation module.

12. The system of claim 11, wherein:
the monitoring module further monitors the usage of the application by monitoring at least one of:
  a frequency with which the application is used on the user device; and
  a change in time-usage on the user device over time; and
the deducing module deduces the value based further on at least one of the monitored frequency and the monitored change in time-usage.

13. The system of claim 11, wherein deducing the value based on the total amount of time for which the application is used on the user device comprises:
  identifying an average total amount of time for which a plurality of user devices use the application, the plurality of user devices comprising the user device;
  determining whether the average amount of time surpasses a use-threshold; and deducing the value based at least in part on the threshold determination.

14. The system of claim 11, wherein:
the monitoring module further monitors the usage of the application by monitoring whether the user accepts and/or declines to make an in-App purchase upon being prompted to make the in-App purchase; and
the deducing module deduces the value based further on whether the user accepts and/or declines to make the in-App purchase.

15. The system of claim 11, wherein:
the monitoring module further monitors the usage of the application by monitoring at least one of:
  a number of times a user is prompted to make an in-App purchase; and
  a frequency at which the user is prompted to make an in-App purchase; and
the deducing module deduces the value based further on at least one of the monitored number of times and the monitored frequency at which the user is prompted to make the in-App purchase.

16. The system of claim 11, wherein the monitoring module further monitors the usage of the application by:
  monitoring traffic between the user device and a website associated with the application; and
  deducing the usage of the application based on the monitored traffic.

17. The system of claim 11, wherein the monitoring module further monitors the usage of the application by collecting information received by a server that provides application purchasing services for the application.

18. The system of claim 11, wherein the monitoring module further monitors the usage of the application by monitoring at least one of:
  an age level at which the application is being used; and
  a change in the age level.

19. The system of claim 18, wherein the creation module creates a plurality of ratings, comprising the rating, each of which is based on a different age level.

20. A non-transitory computer-readable medium comprising one or more computer-readable instructions that, when executed by at least one processor of a computing device, cause the computing device to:
  determine that a user device has downloaded an application;
  monitor the usage of the application on the user device, wherein monitoring the usage comprises:
    identifying a total amount of time for which the application is used on the user device; and
    identifying a total amount spent by the user on the application, the total amount comprising an initial cost of the application and a cost of any subsequent in-App purchases;
  deduce a value of the application based at least in part on the monitored usage, wherein the deducing comprises deducing the value based on:
    the total amount spent by the user on the application; and
    the total amount of time for which the application is used on the user device; and
  create a rating for the application that indicates the deduced value of the application,
  wherein the rating comprises a ratio indicating a cost of the application relative to a time measurement.

* * * * *